United States Patent
Kim et al.

(10) Patent No.: US 8,999,560 B2
(45) Date of Patent: Apr. 7, 2015

(54) PRISMATIC TYPE SECONDARY BATTERY INCLUDING INSULATION TUBE

(75) Inventors: Yongsam Kim, Yongin-si (KR); Sangwon Byun, Yongin-si (KR); Jeongwon Oh, Yongin-si (KR)

(73) Assignees: Samsung SDI Co., Ltd., Yongin-si, Gyeonggi-do (KR); Robert Bosch GmbH, Stuttgart (DE)

(*) Notice: Subject to any disclaimer, the term of this patent is extended or adjusted under 35 U.S.C. 154(b) by 1121 days.

(21) Appl. No.: 12/929,308

(22) Filed: Jan. 13, 2011

(65) Prior Publication Data

US 2012/0021275 A1    Jan. 26, 2012

(30) Foreign Application Priority Data

Jul. 21, 2010    (KR) .................... 10-2010-0070505

(51) Int. Cl.
    *H01M 2/02*    (2006.01)
(52) U.S. Cl.
    CPC .......... *H01M 2/0217* (2013.01); *H01M 2/0267* (2013.01)
(58) Field of Classification Search
    CPC .... H01M 2/02; H01M 2/0207; H01M 2/0267
    USPC ............ 429/148, 162, 163, 66, 96, 100, 120; 206/497; 156/84–86; 428/34.9
    See application file for complete search history.

(56) References Cited

U.S. PATENT DOCUMENTS

| | | | | |
|---|---|---|---|---|
| 5,935,730 A * | 8/1999 | Will et al. | ...................... | 429/167 |
| 6,084,380 A * | 7/2000 | Burton | ........................... | 320/107 |
| 6,127,024 A * | 10/2000 | Weiss et al. | ................... | 428/204 |
| 6,391,490 B1 * | 5/2002 | Aoi et al. | ...................... | 429/176 |
| 6,451,474 B1 * | 9/2002 | Kozu et al. | ..................... | 429/100 |
| 2006/0055371 A1 * | 3/2006 | Rejman | ......................... | 320/112 |
| 2008/0124599 A1 * | 5/2008 | Baik | ................................ | 429/29 |
| 2008/0193837 A1 * | 8/2008 | Lu | .................................. | 429/163 |
| 2009/0081537 A1 * | 3/2009 | Kim | ................................ | 429/176 |
| 2009/0092896 A1 * | 4/2009 | Koh et al. | ..................... | 429/163 |
| 2009/0269654 A1 * | 10/2009 | Kairawicz et al. | ............. | 429/56 |
| 2010/0178535 A1 * | 7/2010 | Lee | .................................. | 429/7 |

FOREIGN PATENT DOCUMENTS

| | | |
|---|---|---|
| JP | 2006-278245 A | 10/2006 |
| JP | 2009-301892 A | 12/2009 |
| KR | 10 2003-00434 A | 6/2003 |
| KR | 10 2009-00110471 A | 10/2009 |
| WO | WO 2010/047905 * 4/2010 | ............. B32B 27/32 |

OTHER PUBLICATIONS

Korean Notice of Allowance in KR 10-2010-0070505, dated Oct. 28, 2011 (Kim, et al.).

* cited by examiner

*Primary Examiner* — Ula C Ruddock
*Assistant Examiner* — Amanda Barrow
(74) *Attorney, Agent, or Firm* — Lee & Morse, P.C.

(57) ABSTRACT

A prismatic type secondary battery including an electrode assembly, the electrode assembly including a first electrode, a second electrode, and a separator between the first and second electrodes; a case accommodating the electrode assembly, the case having an open upper end and at least two pairs of surfaces facing each other; a cap assembly sealing the open upper end of the case; and an insulation tube surrounding a lateral periphery of the case and the cap assembly within a region up to a certain height or greater, the insulation tube including at least one elasticity part at a side thereof.

14 Claims, 8 Drawing Sheets

PRISMATIC TYPE SECONDARY BATTERY INCLUDING INSULATION TUBE

BACKGROUND

1. Field

Embodiments relate to a prismatic type secondary battery including an insulation tube.

2. Description of the Related Art

Secondary batteries are rechargeable batteries, unlike primary batteries that are not rechargeable. Such a secondary battery may be packaged to form a small capacity battery that may be used in portable small electronic devices, e.g., cellular phones and camcorders. In addition, a large capacity battery, which may include tens of battery packs arrayed and electrically connected to one another, may be used as a power source for driving a motor, e.g., of a hybrid vehicle.

Secondary batteries may be manufactured in various shapes, e.g., a cylindrical shape and a prismatic shape. To form a secondary battery, an electrolyte and an electrode assembly formed by interposing a separator as an insulator between a positive electrode plate and a negative electrode plate may be installed in a case. Then, a cap assembly provided with electrode terminals may be installed on the case.

SUMMARY

Embodiments are directed to a prismatic type secondary battery including an insulation tube.

At least one of the above and other features and advantages may be realized by providing a prismatic type secondary battery including an electrode assembly, the electrode assembly including a first electrode, a second electrode, and a separator between the first and second electrodes; a case accommodating the electrode assembly, the case having an open upper end and at least two pairs of surfaces facing each other; a cap assembly sealing the open upper end of the case; and an insulation tube surrounding a lateral periphery of the case and the cap assembly within a region up to a certain height or greater, the insulation tube including at least one elasticity part at a side thereof.

The elasticity part may include at least one bellows ridge extending along a first direction of the insulation tube and to an outside of the insulation tube; and at least one bellows trough at a side portion of the bellows ridge, the bellows trough extending along the first direction of the insulation tube and to an inside of the insulation tube.

The elasticity part may include a plurality of elasticity holes passing through the insulation tube, the elasticity holes being arrayed in a first direction of the insulation tube.

The elasticity holes may have a vertically oblong shape.

The insulation tube may include at least one of polyethylene terephthalate, polyethylene, and polypropylene.

The cap assembly may include a plate-shaped cap plate covering the open upper end of the case, and the insulation tube may have a height that is equal to a sum of a height of the case and a height of the cap plate.

A lower end of the insulation tube may be disposed at a height that is about equal to a height at which a lower end of the case is disposed, and an upper end of the insulation tube may be disposed at a height that is about equal to a height at which an upper end of the cap plate is disposed.

The case may be electrically connected to the first electrode or the second electrode.

The case may have a first side surface and a second side surface facing each other and a third side surface and a fourth side surface facing each other, the first and second side surfaces having smaller areas than areas of the third and fourth side surfaces, and the insulation tube may include a first insulation side part contacting the first side surface; a second insulation side part contacting the second side surface; a third insulation side part contacting the third side surface; and a fourth insulation side part contacting the fourth side surface.

The elasticity part may include elasticity holes passing through at least one of the first through fourth insulation side parts, the elasticity holes being arrayed in a first direction of the first through fourth insulation side parts.

The elasticity part may be heat contracted.

The elasticity part may include a third elasticity part, the third elasticity part including at least one third bellows ridge and at least one third bellows trough, the third bellows ridge and the third bellow trough extending along a first direction on the third insulation side part; and a fourth elasticity part, the fourth elasticity part including at least one fourth bellows ridge and at least one fourth bellows trough, the fourth bellows ridge and the fourth bellows trough extending along the first direction on the fourth insulation side part.

The elasticity part may include a first elasticity part, the first elasticity part including at least one first bellows ridge and at least one first bellows trough, the first bellows ridge and the first bellows trough extending along a first direction on the first insulation side part; and a second elasticity part, the second elasticity part including at least one second bellows ridge and at least one second bellows trough, the second bellows ridge and the second bellows trough extending in the first direction on the second insulation side part.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Korean Patent Application No. 10-2010-0070505 filed on Jul. 21, 2010, in the Korean Intellectual Property Office, and entitled: "Prismatic Type Secondary Battery Including Insulation Tube" is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. In addition, it will also be understood that when an element is referred to as being "between" two elements, it can be the only elements between the two elements, or one or more intervening elements may also be present. Like reference numerals refer to like elements throughout Hereinafter, a configuration of a prismatic type secondary battery will now be described according to an embodiment.

Figure 1A:
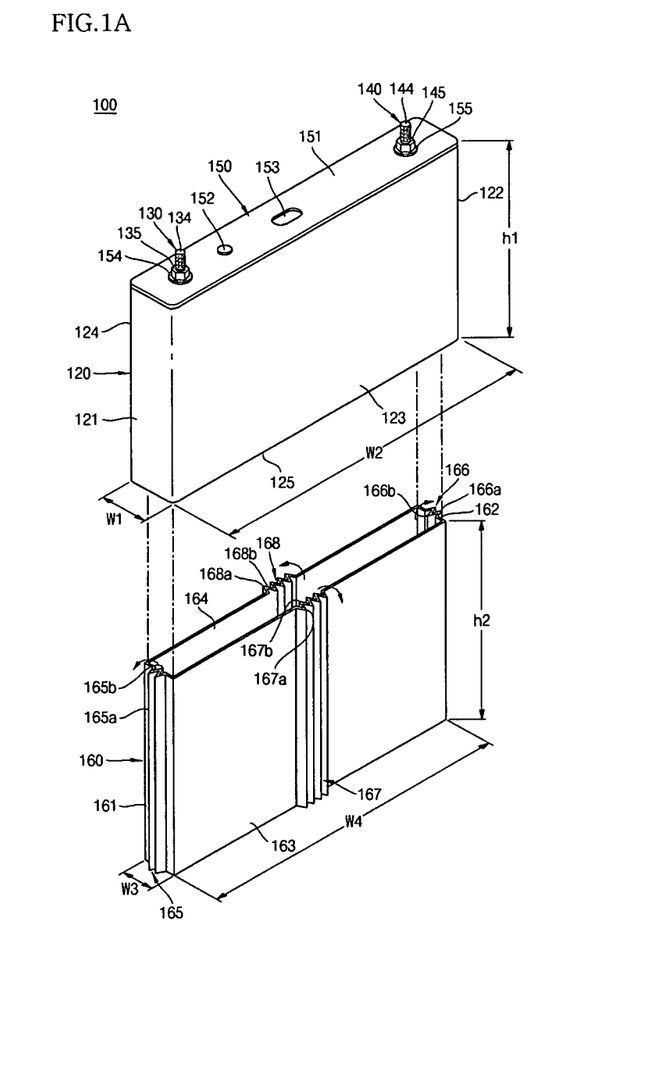
FIG. 1A illustrates a schematic view of a process in which an insulation tube of a secondary battery is coupled to an outside of a case, according to an embodiment.
Figure 1B:
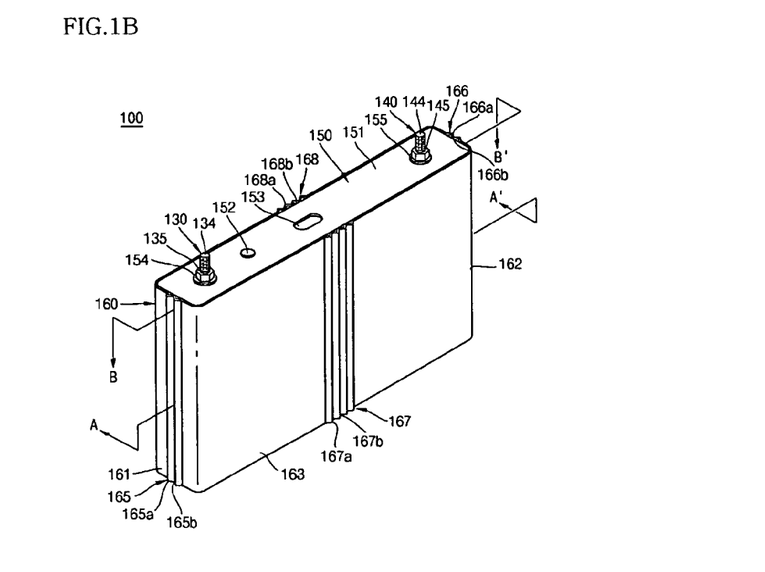
FIG. 1B illustrates a perspective view of a secondary battery according to an embodiment.
Figure 2:
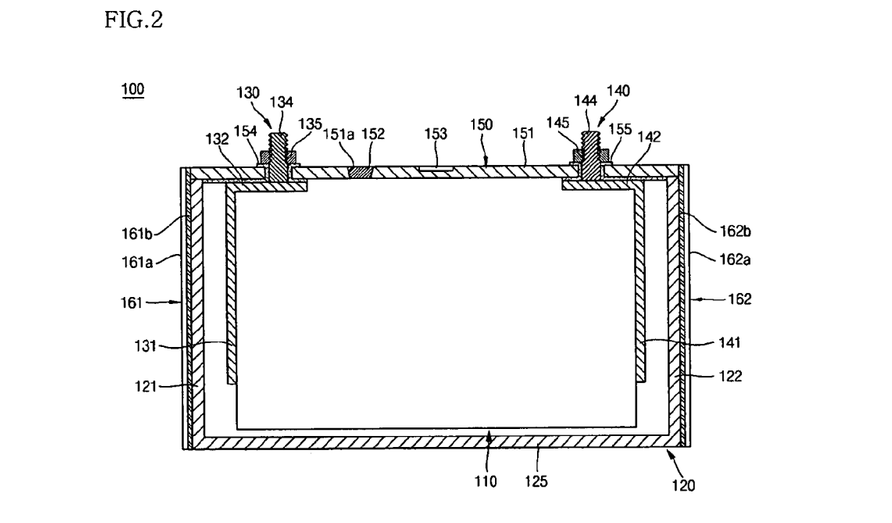
FIG. 2 illustrates a cross-sectional view taken along line A-A' of FIG. 1B.
Figure 3:
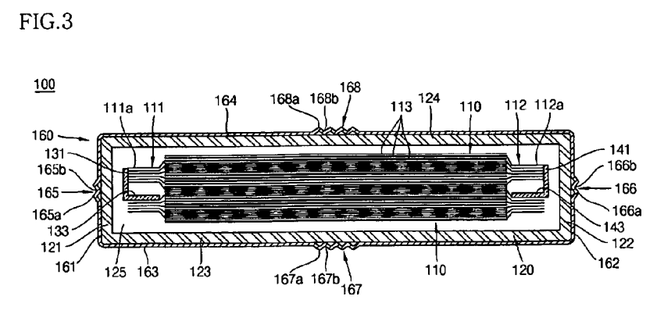
FIG. 3 illustrates a cross-sectional view taken along line B-B' of FIG. 1B.

FIG. 1A illustrates a schematic view of a process in which an insulation tube of a secondary battery is coupled to an outside of a case, according to an embodiment. FIG. 1B illustrates a perspective view of a secondary battery according to an embodiment. FIG. 2 illustrates a cross-sectional view taken along line A-A' of FIG. 1B. FIG. 3 illustrates a cross-sectional view taken along line B-B' of FIG. 1B.

Referring to FIGS. 1A through 3, a prismatic type secondary battery 100 according to an embodiment may include an electrode assembly 110, a case 120, a first electrode terminal 130, a second electrode terminal 140, a cap assembly 150, and an insulation tube 160.

The electrode assembly 110 may include a first electrode 111, a second electrode 112, and a separator 113 between the first and second electrodes 111 and 112, which may have a plate or film shape. The electrode assembly 110 may be formed by winding or stacking stacked bodies including the first and second electrodes 111 and 112 and the separator 113. Here, the first electrode 111 may function as a positive electrode or a negative electrode; and the second electrode 112 may have an opposite polarity to that of the first electrode 111. Hereinafter, it is assumed that the first electrode 111 is a positive electrode and the second electrode 112 is a negative electrode.

The first electrode 111 may be formed by applying a first electrode active material, e.g., a transition metal oxide, on a first electrode collector formed of metal foil, e.g., aluminum foil. The first electrode 111 may include a first electrode non-coating portion 111a, e.g., a region where the first electrode active material is not applied. The first electrode non-coating portion 111a may function as a passage for current between the first electrode 111 and an outside of the first electrode 111. A material of the first electrode 111 is not limited herein.

The second electrode 112 may be formed by applying a second electrode active material, e.g., graphite or carbon, on a second electrode collector formed of metal foil, e.g., nickel or copper. The second electrode 112 may include a second electrode non-coating portion 112a, e.g., a region where the second electrode active material is not applied. The second electrode non-coating portion 112a may function as a passage for current between the second electrode 112 and an outside of the second electrode 112. A material of the second electrode 112 is not limited herein.

The separator 113 may be disposed between the first electrode 111 and the second electrode 112 to prevent a short circuit and facilitate movement of lithium ions. The separator 113 may be formed of, e.g., polyethylene, polypropylene, or combination film of polyethylene and polypropylene. However, a material of the separator 113 is not limited herein.

The case 120 may have a box shape with an open upper end. For example, the case 120 may include a first side surface 121, a second side surface 122, a third side surface 123, a fourth side surface 124, and a bottom part 125. The first and second side surfaces 121 and 122 may face each other. The third and fourth side surfaces 123 and 124 may face each other. The bottom part 125 may connect a lower end of the first side surface 121, a lower end of the second side surface 122, a lower end of the third side surface 123, and a lower end of the fourth side surface 124. The first and second side surfaces 121 and 122 may be smaller in area than the third and fourth side surfaces 123 and 124. When a plurality of prismatic type secondary batteries are electrically connected to each other in order to achieve a high voltage, the prismatic type secondary batteries may be arrayed to face respective large side surfaces, e.g., face the respective third and fourth side surfaces 123 and 124. The case 120 may be formed of a conductive metal, e.g., aluminum, aluminum alloy, and/or steel plated with nickel. The case 120 may be electrically connected to the first electrode 111 or the second electrode 112.

The first electrode terminal 130 may include a first extension part 131, a second extension part 132, a welding part 133, a bolt extension part 134, and a nut 135. The first extension part 131 may be disposed at a side of the electrode assembly 110. The second extension part 132 may extend from an upper portion of the first extension part 131. The welding part 133 may extend from a portion of the first extension part 131 and may be inserted into the first electrode 111 of the electrode assembly 110, e.g., inserted to a constant depth into an inside of the first electrode non-coating portion 111a. The welding part 133 may be welded to the first electrode non-coating portion 111a. The bolt extension part 134 may extend upwardly from the second extension part 132, may pass through a cap plate 151 that will be described below, and may protrude outside. The nut 135 may be coupled to the bolt extension part 134 so that the first electrode terminal 130 may be securely fixed to the cap plate 151.

The second electrode terminal 140 may include a first extension part 141, a second extension part 142, a welding part 143, a bolt extension part 144, and a nut 145. The first extension part 141 may be disposed at another side of the electrode assembly 140. The second extension part 142 may extend from an upper portion of the first extension part 141. The welding part 143 may extend from a portion of the first extension part 141 and may be inserted into the second electrode 112 of the electrode assembly 110, e.g., inserted to a constant depth into an inside of the second electrode non-coating portion 112a. The welding part 143 may be welded to the second electrode non-coating portion 112a. The bolt extension part 144 may extend upwardly from the second extension part 142, may pass through the cap plate 151 that will be described below, and may protrude outside. The nut 145 may be coupled to the bolt extension part 144 so that the second electrode terminal 140 may be securely fixed to the cap plate 151.

The cap assembly 150 may include the cap plate 151, an electrolyte plug 152, a safety vent 153, a first insulation material 154, and a second insulation material 155.

The cap plate 151 may have a plate shape. The cap plate 151 may include an electrolyte injection hole 151a at a predetermined position for injecting electrolyte into the case 120. The cap plate 151 may cover the open upper end of the case 120. The first electrode terminal 130 may pass through a side of the cap plate 151; and the second electrode terminal 140 may pass through another side of the cap plate 151. The cap plate 151 may be formed of the same material as that of the case 120. A boundary between the cap plate 151 and the case 120 may be welded with, e.g., a laser. The cap plate 151, together with the case 120, may be electrically connected to the first electrode 111 or the second electrode 112.

The electrolyte plug 152 may plug the electrolyte injection hole 151*a* of the cap plate 151. The safety vent 153 may have a relatively small thickness in the cap plate 151.

The first insulation material 154 may be formed on a periphery of the bolt extension part 134 of the first electrode terminal 130. The first insulation material 154 may be formed of an insulation material to electrically insulate the first electrode terminal 130 and the cap plate 151.

The second insulation material 155 may be formed on a periphery of the bolt extension part 144 of the second electrode terminal 140. The second insulation material 155 may be formed of an insulation material to electrically insulate the second electrode terminal 140 and the cap plate 151.

The insulation tube 160 may have a through-shape extending from an upper side to a lower side to surround a lateral periphery of the case 120 and the cap assembly 150 within a region up to a certain height or greater. The insulation tube 160 may include at least one stretchable elasticity part at a side thereof. For example, the insulation tube 160 may include a first insulation side part 161, a second insulation side part 162, a third insulation side part 163, and a fourth insulation side part 164, and at least one of a first elasticity part 165, a second elasticity part 166, a third elasticity part 167, and a fourth elasticity part 168. Hereinafter, a first direction is defined as a direction from an upper end of the insulation tube 160 to a lower end thereof.

The first insulation side part 161 may contact the first side surface 121 of the case 120.

The second insulation side part 162 may face the first insulation side part 161 and may contact the second side surface 122 of the case 120.

The third insulation side part 163 may connect a side end of the first insulation side part 161 to a side end of the second insulation side part 162. The third insulation side part 163 may contact the third side surface 123 of the case 120.

The fourth insulation side part 164 may face the third insulation side part 163 and may connect another side end of the first insulation side part 161 to another side end of the second insulation side part 162. The fourth insulation side part 164 may contact the fourth side surface 124 of the case 120.

The first elasticity part 165 may have a bellows structure. For example, the first elasticity part 165 may include one or more first bellows ridges 165*a* and one or more first bellows troughs 165*b*. The first bellows ridge 165*a* may extend along the first direction of the first insulation side part 161. The first bellows ridge 165*a* may also extend to an outside of the insulation tube 160. The first bellows trough 165*b* may be disposed at a side of the first bellows ridge 165*a* and may extend along the first direction at the first insulation side part 161. The first bellows trough 165*b* may also extend to an inside of the insulation tube 160. The first bellows ridge 165*a* and the first bellows trough 165*b* of the first elasticity part 165 may elastically contract and expand so that the first insulation side part 161 may be contracted and expanded in both extension side directions of the first insulation side part 161.

The second elasticity part 166 may have a bellows structure. For example, the second elasticity part 166 may include one or more second bellows ridges 166*a* and one or more second bellows troughs 166*b*. The second bellows ridge 166*a* may extend along the first direction at the second insulation side part 162. The second bellows ridge 166*a* may also extend to an outside of the insulation tube 160. The second bellows trough 166*b* may be disposed at a side of the second bellows ridge 166*a* and may extend along the first direction at the second insulation side part 162. The second bellows trough 166*b* may also extend to an inside of the insulation tube 160. The second bellows ridge 166*a* and the second bellows trough 166*b* of the second elasticity part 166 may elastically contract and expand so that the second insulation side part 162 may be contracted and expanded in both extension side directions of the second insulation side part 162.

The third elasticity part 167 may have a bellows structure. For example, the third elasticity part 167 may include one or more third bellows ridges 167*a* and one or more third bellows troughs 167*b*. The third bellows ridge 167*a* may extend along the first direction at the third insulation side part 163. The third bellows ridge 167*a* may also extend to the outside of the insulation tube 160. The third bellows trough 167*b* may be disposed at a side of the third bellows ridge 167*a* and may extend along the first direction at the third insulation side part 163. The third bellows trough 167*b* may slo extend to the inside of the insulation tube 160. The third bellows ridge 167*a* and the third bellows trough 167*b* of the third elasticity part 167 may elastically contract and expand so that the third insulation side part 163 may be contracted and expanded in both extension side directions of the third insulation side part 163.

The fourth elasticity part 168 may have a bellows structure. For example, the fourth elasticity part 168 may include one or more fourth bellows ridges 168*a* and one or more fourth bellows troughs 168*b*. The fourth bellows ridge 168*a* may extend along the first direction at the fourth insulation side part 164. The fourth bellows ridge 168*a* may also extend to the outside of the insulation tube 160. The fourth bellows trough 168*b* may be disposed at a side of the fourth bellows ridge 168*a* and may extend along the first direction at the fourth insulation side part 164. The fourth bellows trough 168*b* may also extend to the inside of the insulation tube 160. The fourth bellows ridge 168*a* and the fourth bellows trough 168*b* of the fourth elasticity part 168 may elastically contract and expand so that the fourth insulation side part 164 may be contracted and expanded in both extension side directions of the fourth insulation side part 164.

The insulation tube 160 may include, e.g., polyethylene terephthalate, polyethylene, and/or polypropylene. The insulation tube 160 formed of an insulation material may prevent a short circuit between adjacent secondary batteries or between a secondary battery and an external device. The insulation tube 160 may have a height h2 that is about equal to a sum height h1 of a height of the case 120 and a height of the cap plate 151.

Before the insulation tube 160 is coupled to the outside of the case 120 and the cap assembly 150, the first and second insulation side parts 161 and 162 may each have a width W3 that is smaller than a width W1 of each of the first and second side surfaces 121 and 122 of the case 120. Before the insulation tube 160 is coupled to the outside of the case 120 and the cap assembly 150, the third and fourth insulation side parts 163 and 164 may each have a width W4 that is smaller than a width W2 of each of the third and fourth side surfaces 123 and 124 of the case 120. As described above, the insulation tube 160 may include the elasticity parts, e.g., the first, second, third, and fourth electricity parts 165, 166, 167, and 168. Thus, the insulation tube 160 may expand outwardly and the case 120 and the cap assembly 150 may be easily disposed within or inserted into the insulation tube 160 as illustrated in FIG. 1A.

Hereinafter, a configuration of a secondary battery according to another embodiment will now be described.

Figure 4A:
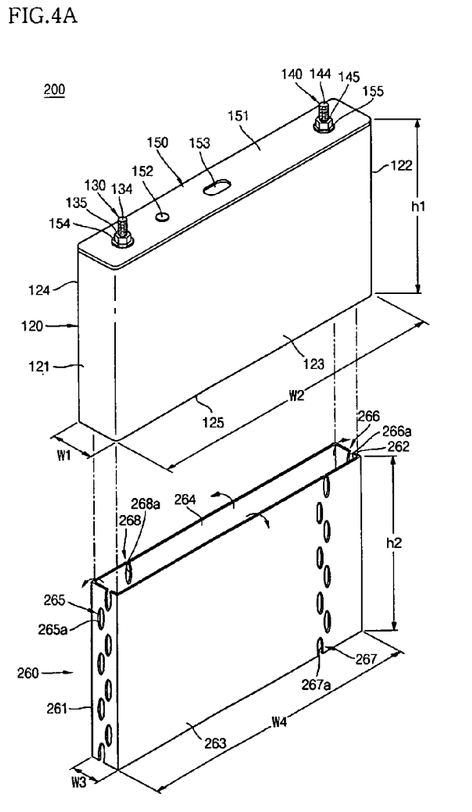
FIG. 4A illustrates a schematic view of a process in which an insulation tube of a secondary battery is coupled to an outside of a case, according to another embodiment.
Figure 4B:
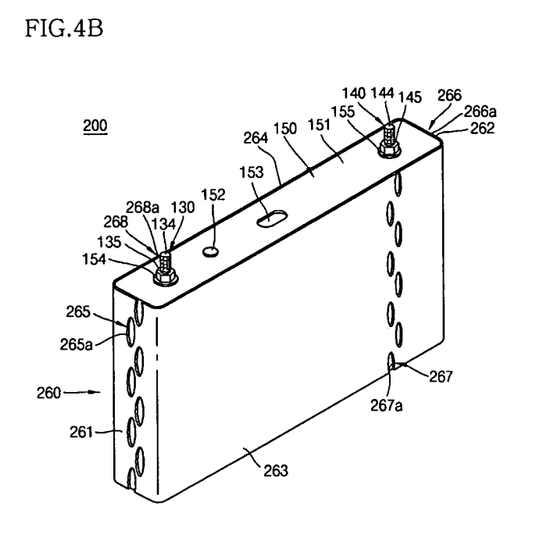
FIG. 4B illustrates a perspective view of a secondary battery according to another embodiment.

FIG. 4A illustrates a schematic view of a process in which an insulation tube of a secondary battery is coupled to an outside of a case, according to another embodiment. FIG. 4B illustrates a perspective view of a secondary battery according to another embodiment.

Referring to FIGS. 4A and 4B, a secondary battery 200 according to the present embodiment is different from the secondary battery 100 illustrated in FIGS. 1A through 3 in the structure of an insulation tube 260. Thus, the secondary battery 200 will now be described with respect to the insulation tube 260. In addition, in the secondary batteries 100 and 200, like reference numerals denote like elements and thus, repeated detailed descriptions thereof will be omitted.

The secondary battery 200 may include the electrode assembly 110, the case 120, the first electrode terminal 130, the second electrode terminal 140, the cap assembly 150, and the insulation tube 260.

The insulation tube 260 may have a through-shape extending from an upper side to a lower side to surround a lateral periphery of the case 120 and the cap assembly 150. The insulation tube 260 may include at least one stretchable elasticity part at a side thereof. The elasticity part may include a plurality of elasticity holes passing through the insulation tube 260 and may be arrayed in a first direction of the insulation tube 260. For example, the insulation tube 260 may include a first insulation side part 261, a second insulation side part 262, a third insulation side part 263, and a fourth insulation side part 264 and at least one of a first elasticity part 265, a second elasticity part 266, a third elasticity part 267, and a fourth elasticity part 268. Hereinafter, the first direction is defined as a direction from an upper end of the insulation tube 260 to a lower end thereof.

The first insulation side part 261 may contact the first side surface 121 of the case 120.

The second insulation side part 262 may face the first insulation side part 261 and may contact the second side surface 122 of the case 120.

The third insulation side part 263 may connect a side end of the first insulation side part 261 to a side end of the second insulation side part 262. The third insulation side part 263 may contact the third side surface 123 of the case 120.

The fourth insulation side part 264 may face the third insulation side part 263 and may connect another side end of the first insulation side part 261 to another side end of the second insulation side part 262. The fourth insulation side part 264 may contact the fourth side surface 124 of the case 120.

The first elasticity part 265 may include a plurality of first elasticity holes 265a. The first elasticity holes 265a passing through the first insulation side part 261 may be elongated vertically. In other words, the first elasticity holes 265a may have a vertically oblong shape. The first elasticity holes 265a may be arrayed in the first direction at the first insulation side part 261. The first elasticity holes 265a may be configured such that the first insulation side part 261 is easily contracted and expanded in both extension side directions of the first insulation side part 261. In addition, heat generated from the secondary battery 200 during charge/discharge may be emitted through the first elasticity holes 265a.

The second elasticity part 266 may include a plurality of second elasticity holes 266a. The second elasticity holes 266a passing through the second insulation side part 262 may be elongated vertically. In other words, the second elasticity holes 266a may have a vertically oblong shape. The second elasticity holes 266a may be arrayed in the first direction at the second insulation side part 262. The second elasticity holes 266a may be configured such that the second insulation side part 262 is easily contracted and expanded in both extension side directions of the second insulation side part 262. In addition, heat generated from the secondary battery 200 during charge/discharge may be emitted through the second elasticity holes 266a.

The third elasticity part 267 may include a plurality of third elasticity holes 267a. The third elasticity holes 267a passing through the third insulation side part 263 may be elongated vertically. In other words, the third elasticity holes 267a may have a vertically oblong shape. The third elasticity holes 267a may be arrayed in the first direction at the third insulation side part 263. The third elasticity holes 267a may be configured such that the third insulation side part 263 is easily contracted and expanded in both extension side directions of the third insulation side part 263. In addition, heat generated from the secondary battery 200 during charge/discharge may be emitted through the third elasticity holes 267a.

The fourth elasticity part 268 may include a plurality of third elasticity holes 268a. The fourth elasticity holes 268a passing through the fourth insulation side part 264 may be elongated vertically. In other words, the fourth elasticity holes 268a may have a vertically oblong shape. The fourth elasticity holes 268a may be arrayed in the first direction at the fourth insulation side part 264. The fourth elasticity holes 268a may be configured such that the fourth insulation side part 264 is easily contracted and expanded in both extension side directions of the fourth insulation side part 264. In addition, heat generated from the secondary battery 200 during charge/discharge may be emitted through the fourth elasticity holes 268a.

The third elasticity holes 267a of the third elasticity part 267 in the third insulation side part 263 may be closer to the second insulation side part 262 than to the first insulation side part 261. The fourth elasticity holes 268a of the fourth elasticity part 268 in the fourth insulation side part 264 may be closer to the first insulation side part 261 than to the second insulation side part 262. Thus, when a plurality of secondary batteries 200 are arrayed to face respective third and fourth side surfaces 123 and 124, which may be greater in area than the first and second side surfaces 121 and 122, elasticity holes between the adjacent secondary batteries 200, e.g., the third elasticity holes 267a of a secondary battery at a side and the fourth elasticity holes 268a of a secondary battery adjacent to the second battery, may not overlap each other. Accordingly, an undesirable short circuit due to contact between the cases 120 of the adjacent second batteries 200 may be prevented.

The insulation tube 260 may include, e.g., polyethylene terephthalate, polyethylene, and/or polypropylene. The insulation tube 260 formed of an insulation material may prevent a short circuit between adjacent secondary batteries or between a secondary battery and an external device. The insulation tube 260 may have the height h2 that is about equal to a sum height h1 of a height of the case 120 and a height of the cap plate 151.

Before the insulation tube 260 is coupled to the outside of the case 120 and the cap assembly 150, the first and second insulation side parts 261 and 262 may each have a width W3 that is smaller than a width W1 of each of the first and second side surfaces 121 and 122 of the case 120. Before the insulation tube 260 is coupled to the outside of the case 120 and the cap assembly 150, the third and fourth insulation side parts 263 and 264 may each have a width W4 that is smaller than a width W2 of each of the third and fourth side surfaces 123 and 124 of the case 120. As described above, the insulation tube 260 may include the elasticity parts, e.g., the first, second, third, and fourth electricity parts 265, 266, 267, and 268. Thus, the insulation tube 260 may expand outwardly. Then, the case 120 and the cap assembly 150 may be easily disposed within the insulation tube 260 as illustrated in FIG. 4A.

Hereinafter, a configuration of a secondary battery according to yet another embodiment will now be described.

Figure 5A:
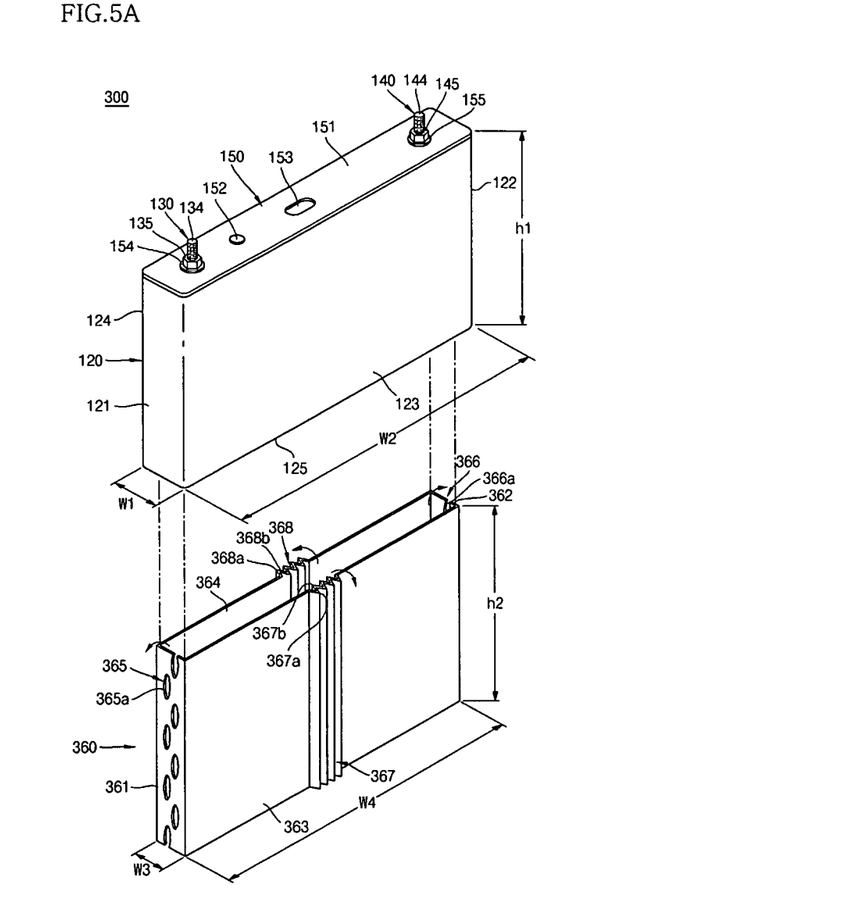
FIG. 5A illustrates a schematic view of a process in which an insulation tube of a secondary battery is coupled to an outside of a case, according to yet another embodiment.
Figure 5B:
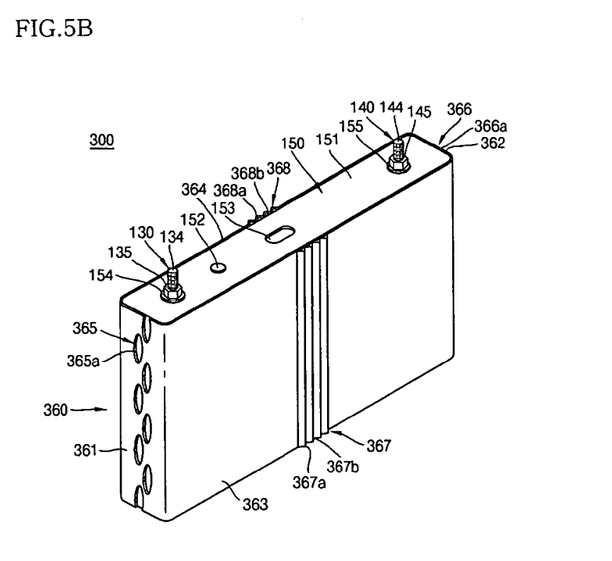
FIG. 5B illustrates a perspective view of a secondary battery according to yet another embodiment.

FIG. 5A illustrates a schematic view of a process in which an insulation tube of a secondary battery is coupled to an outside of a case, according to yet another embodiment. FIG. 5B illustrates a perspective view of a secondary battery according to yet another embodiment.

Referring to FIGS. 5A and 5B, a secondary battery 300 according to the present embodiment is different from the secondary battery 100 illustrated in FIGS. 1A through 3 in the structure of an insulation tube 360. Thus, the secondary battery 300 will now be described with respect to the insulation tube 360. In addition, in the secondary batteries 100 and 300, like reference numerals denote like elements, and thus, repeated detailed descriptions thereof will be omitted.

The secondary battery 300 may include the electrode assembly 110, the case 120, the first electrode terminal 130, the second electrode terminal 140, the cap assembly 150, and the insulation tube 360.

The insulation tube 360 may have a through-shape extending from an upper side to a lower side to surround a lateral periphery of the case 120 and the cap assembly 150. The insulation tube 360 may include at least one stretchable elasticity part at a side thereof. For example, the insulation tube 360 may include a first insulation side part 361, a second insulation side part 362, a third insulation side part 363, and a fourth insulation side part 364 and at least one of a first elasticity part 365, a second elasticity part 366, a third elasticity part 367, and a fourth elasticity part 368. Hereinafter, a first direction is defined as a direction from the upper end of the insulation tube 360 to the lower end thereof.

The first insulation side part 361 may contact the first side surface 121 of the case 120.

The second insulation side part 362 may face the first insulation side part 361 and may contact the second side surface 122 of the case 122.

The third insulation side part 363 may connect a side end of the first insulation side part 361 to a side end of the second insulation side part 362. The third insulation side part 363 may contact the third side surface 123 of the case 120.

The fourth insulation side part 364 may face the third insulation side part 363 and may connect another side end of the first insulation side part 361 to another side end of the second insulation side part 362. The fourth insulation side part 364 may contact the fourth side surface 124 of the case 120.

The first elasticity part 365 may include a plurality of elasticity holes 365a. The first elasticity holes 365a passing through the first insulation side part 361 may be elongated vertically. In other words, the first elasticity holes 365a may have a vertically oblong shape. The first elasticity holes 365a may be arrayed in the first direction at the first insulation side part 361. The first elasticity holes 365a may be configured such that the first insulation side part 361 is easily contracted and expanded in both extension side directions of the first insulation side part 361. In addition, heat generated from the secondary battery 300 during charge/discharge may be emitted through the first elasticity holes 365a.

The second elasticity part 366 may include a plurality of second elasticity holes 366a. The second elasticity holes 366a passing through the second insulation side part 362 may be elongated vertically. In other words, the second elasticity holes 366a may have a vertically oblong shape. The second elasticity holes 366a may be arrayed in the first direction at the second insulation side part 362. The second elasticity holes 366a may be configured such that the second insulation side part 362 are easily contracted and expanded in both extension side directions of the second insulation side part 362. In addition, heat generated from the secondary battery 300 during charge/discharge may be emitted through the second elasticity holes 366a.

The third elasticity part 367 may have a bellows structure. For example, the third elasticity part 367 may include one or more third bellows ridges 367a and one or more third bellows troughs 367b. The third bellows ridge 367a may extend along the first direction at the third insulation side part 363. The third bellows ridge 367a may also extend to an outside of the insulation tube 360. The third bellows trough 367b may be disposed at a side of the third bellows ridge 367a and may extend along the first direction at the third insulation side part 363. The third bellows trough 367b may also extend to an inside of the insulation tube 360. The third bellows ridge 367a and the third bellows trough 367b of the third elasticity part 367 may elastically contract and expand so that the third insulation side part 363 may be contracted and expanded in both extension side directions of the third insulation side part 363.

The fourth elasticity part 368 may have a bellows structure. For example, the fourth elasticity part 368 may include one or more fourth bellows ridges 368a and one or more fourth bellows troughs 368b. The fourth bellows ridge 368a may extend along the first direction at the fourth insulation side part 364. The fourth bellows ridge 368a may also extend to the outside of the insulation tube 360. The fourth bellows trough 368b may be disposed at a side of the fourth bellows ridge 368a and may extend along the first direction at the fourth insulation side part 364. The fourth bellows trough 368b may also extend to the inside of the insulation tube 360. The fourth bellows ridge 368a and the fourth bellows trough 368b of the fourth elasticity part 368 may elastically contract and expand so that the fourth insulation side part 364 may be contracted and expanded in both extension side directions of the fourth insulation side part 364.

The insulation tube 360 may include, e.g., polyethylene terephthalate, polyethylene, and/or polypropylene. The insulation tube 360 formed of an insulation material may prevent a short circuit between adjacent secondary batteries or between a secondary battery and an external device. As described above, the insulation tube 360 may include the elasticity parts, e.g., the first, second, third, and fourth electricity parts 365, 366, 367, and 368. Thus, the insulation tube 360 may expand outwardly and the case 120 and the cap assembly 150 may be easily disposed within or inserted into the insulation tube 360 as illustrated in FIG. 5A.

Hereinafter, a configuration of a secondary battery according to still another embodiment will now be described.

Figure 6:
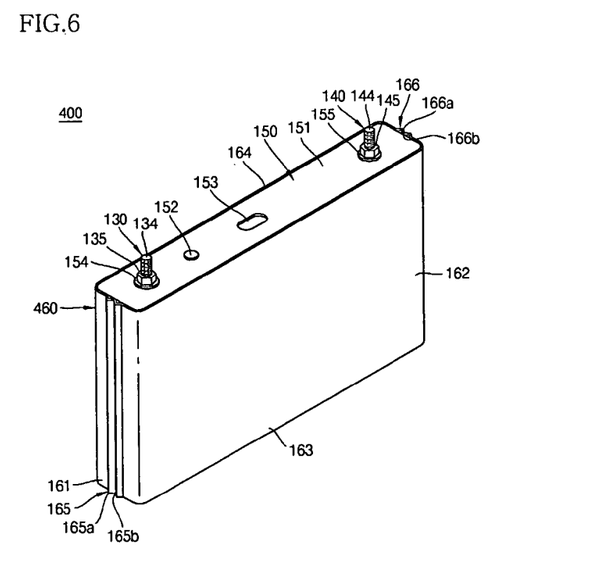
FIG. 6 illustrates a perspective view of a secondary battery according to still another embodiment.

FIG. 6 illustrates a perspective view of a secondary battery according to still another embodiment.

Referring to FIG. 6, a secondary battery 400 according to the present embodiment is different from the secondary battery 100 illustrated in FIGS. 1A through 3 in the structure of an insulation tube 460. Thus, the secondary battery 400 will now be described with respect to the insulation tube 460. In addition, in the secondary batteries 100 and 400, like reference numerals denote like elements, and thus, repeated detailed descriptions thereof will be omitted.

The insulation tube 460 of the secondary battery 400 is different from that of the secondary battery 100 of FIG. 1B in that an elasticity part may not be provided to the third and fourth insulation side parts 163 and 164. For example, only the first insulation side part 161 may include the first elasticity part 165 including the first bellows ridge 165a and the first bellows trough 165b and the second insulation side part 162 may be provided with the second elasticity part 166 including the second bellows ridge 166a and the second bellows trough 166b. The third and fourth insulation side parts 163 and 164 may be flat without an elasticity part. Thus, a plurality of secondary batteries 400 may be easily arrayed to face respective third or fourth insulation side parts 163 or 164 having a large area.

Hereinafter, a configuration of a secondary battery according to still another embodiment will now be described.

Figure 7:
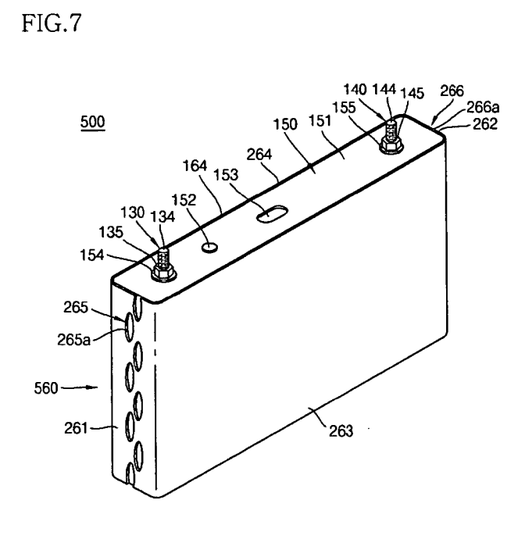
FIG. 7 illustrates a perspective view of a secondary battery according to still another embodiment.

FIG. 7 illustrates a perspective view of a secondary battery according to still another embodiment.

Referring to FIG. 7, a secondary battery 500 according to the present embodiment is different from the secondary battery 200 illustrated in FIGS. 4A and 4B in the structure of an insulation tube 560. Thus, the secondary battery 500 will now be described with respect to the insulation tube 560. In addition, in the secondary batteries 200 and 500, like reference numerals denote like elements, and thus, repeated detailed descriptions thereof will be omitted.

The insulation tube 560 of the secondary battery 500 is different from that of the secondary battery 200 of FIGS. 4A and 4B in that an elasticity part may not be provided to the third and fourth insulation side parts 263 and 264. For example, the first insulation side part 261 may include the first elasticity part 265 including the first elasticity holes 265a and the second insulation side part 262 may include the second elasticity part 266 including the second elasticity holes 266a. The third and fourth insulation side parts 163 and 164 may be flat without an elasticity part. Thus, a plurality of secondary batteries 400 may be easily arrayed to face respective third or fourth insulation side parts 163 or 164 having a large area.

Hereinafter, a configuration of a secondary battery according to still another embodiment will now be described.

Figure 8:
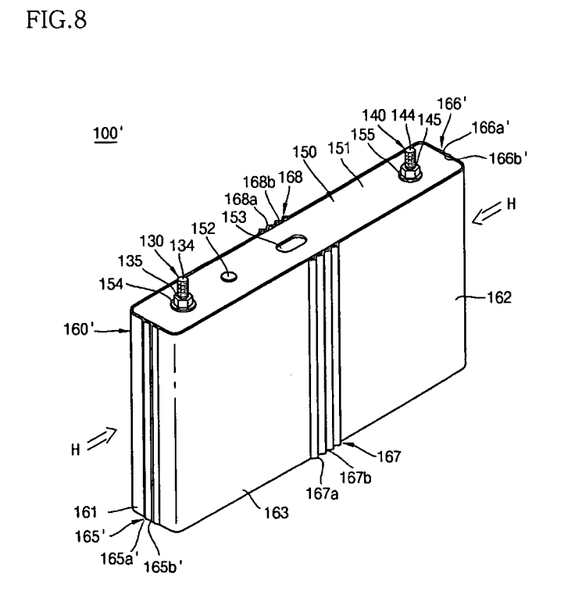
FIG. 8 illustrates a perspective view of a secondary battery according to still another embodiment.

FIG. 8 illustrates a perspective view of a secondary battery according to still another embodiment.

Referring to FIG. 8, a secondary battery 100' according to the present embodiment is different from the secondary battery 100 illustrated in FIGS. 1A through 3 in the structure of an insulation tube 160'. Thus, the secondary battery 100' will now be described with respect to the insulation tube 160'. In addition, in the secondary batteries 100 and 100', like reference numerals denote like elements, and thus, repeated detailed descriptions thereof will be omitted.

The insulation tube 160' may include the first insulation side part 161, the second insulation side part 162, the third insulation side part 163, and the fourth insulation side part 164 and at least one of a first elasticity part 165', a second elasticity part 166', a third elasticity part 167', and a fourth elasticity part 168'. The insulation tube 160' may be thermally contracted by heating (H) the first and second elasticity parts 165 and 166 of the insulation tube 160 of the secondary battery 100 illustrated in FIG. 1B. For example, in the secondary battery 100' according to the present embodiment, a first bellows ridge 165a' and a first bellows trough 165b' of the first elasticity part 165' may be thermally contracted to closely contact the case 120. In addition, a second bellows ridge 166a' and a second bellows trough 166b' of the second elasticity part 166' may be thermally contracted to closely contact the case 120. Thus, the insulation tube 160' as a whole may further closely contact the case 120 and the cap assembly 150.

Hereinafter, a configuration of a secondary battery according to still another embodiment will now be described.

Figure 9:
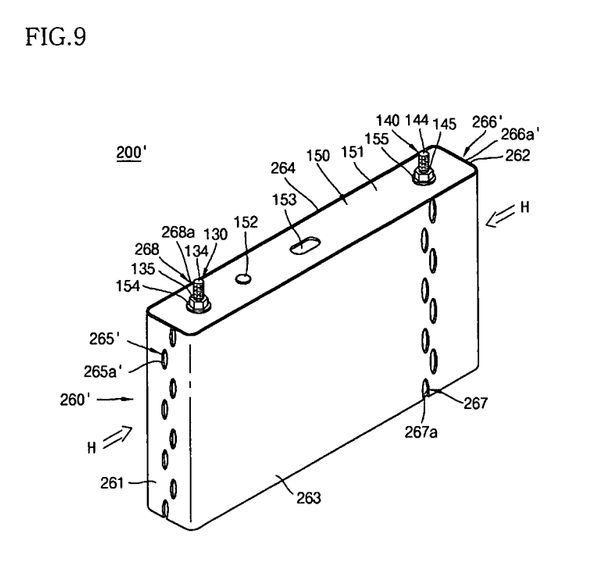
FIG. 9 illustrates a perspective view of a secondary battery according to still another embodiment.

FIG. 9 illustrates a perspective view of a secondary battery according to still another embodiment.

Referring to FIG. 9, a secondary battery 200' according to the present embodiment is different from the secondary battery 200 illustrated in FIGS. 4A and 4B in the structure of an insulation tube 260'. Thus, the secondary battery 200' will now be described with respect to the insulation tube 260'. In addition, in the secondary batteries 200 and 200', like reference numerals denote like elements, and thus, repeated detailed descriptions thereof will be omitted.

The insulation tube 260' may include the first insulation side part 261, the second insulation side part 262, the third insulation side part 263, and the fourth insulation side part 264 and at least one of a first elasticity part 265', a second elasticity part 266', a third elasticity part 267', and a fourth elasticity part 268'. The insulation tube 260' may be thermally contracted by heating (H) the first and second elasticity parts 265 and 266 of the insulation tube 260 of the secondary battery 200 illustrated in FIG. 4B. For example, in the secondary battery 200', first elasticity holes 265a' of the first elasticity part 265' and second elasticity holes 266a' of the second elasticity part 266' may be thermally contracted. Thus, the insulation tube 260' as a whole may further closely contact the case 120 and the cap assembly 150.

The prismatic type secondary battery according to the embodiments may include the insulation tube at the outside thereof so that the prismatic type secondary battery may be electrically insulated from another prismatic secondary battery adjacent to the prismatic type secondary battery or from an external device.

In addition, the insulation tube of the prismatic type secondary battery according to the embodiments may include the elasticity part so that the insulation tube may be easily coupled to the outside of the case and the cap plate.

In addition, the insulation tube of the prismatic type secondary battery according to the embodiments may include any combination of elasticity parts. For example, the insulation tube may include one bellows type elasticity part and three sets of elasticity holes, may include three bellows type elasticity part and one set of elasticity holes, may include one bellows type elasticity part and two sets of elasticity holes, etc.

The embodiments provide a secondary battery including an insulation tube for electrical insulation from another adjacent prismatic secondary battery or from an external device, the insulation tube being easily coupleable to an outside of a case.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present disclosure as set forth in the following claims.

What is claimed is:
1. A prismatic secondary battery, comprising:
an electrode assembly, the electrode assembly including a first electrode, a second electrode, and a separator between the first and second electrodes;

a case accommodating the electrode assembly, the case having an open upper end and at least two pairs of surfaces facing each other;
a cap assembly sealing the open upper end of the case; and
an insulation tube surrounding a lateral periphery of the case and the cap assembly within a region up to a certain height or greater, the insulation tube including at least one elastically deformable part at a side thereof,
wherein the at least one elastically deformable part includes:
at least one first bellows ridge extending along a first direction of the insulation tube and to an outside of the insulation tube; and
at least one first bellows trough at a side portion of the at least one first bellows ridge, the at least one first bellows trough extending along the first direction of the insulation tube and to an inside of the insulation tube.

2. The prismatic secondary battery as claimed in claim 1, wherein the at least one elastically deformable part further includes a plurality of elastically deformable holes passing through the insulation tube, the elastically deformable holes being arrayed in the first direction of the insulation tube.

3. The prismatic secondary battery as claimed in claim 2, wherein the elastically deformable holes have a vertically oblong shape.

4. The prismatic secondary battery as claimed in claim 1, wherein the insulation tube includes at least one of polyethylene terephthalate, polyethylene, and polypropylene.

5. The prismatic secondary battery as claimed in claim 1, wherein:
the cap assembly includes a plate-shaped cap plate covering the open upper end of the case, and
the insulation tube has a height that is equal to a sum of a height of the case and a height of the cap plate.

6. The prismatic secondary battery as claimed in claim 5, wherein:
a lower end of the insulation tube is disposed at a height that is about equal to a height at which a lower end of the case is disposed, and
an upper end of the insulation tube is disposed at a height that is about equal to a height at which an upper end of the cap plate is disposed.

7. The prismatic secondary battery as claimed in claim 1, wherein the case is electrically connected to the first electrode or the second electrode.

8. The prismatic secondary battery as claimed in claim 1, wherein:
the case has a first side surface and a second side surface facing each other and a third side surface and a fourth side surface facing each other, the first and second side surfaces having smaller areas than areas of the third and fourth side surfaces, and
the insulation tube includes:
a first insulation side part contacting the first side surface;
a second insulation side part contacting the second side surface;
a third insulation side part contacting the third side surface; and
a fourth insulation side part contacting the fourth side surface.

9. The prismatic secondary battery as claimed in claim 8, wherein the at least one elastically deformable part further includes elastically deformable holes passing through at least one of the first through fourth insulation side parts, the elastically deformable holes being arrayed in the first direction of the first through fourth insulation side parts.

10. The prismatic secondary battery as claimed in claim 8, wherein the at least one elastically deformable part is heat contracted.

11. The prismatic secondary battery as claimed in claim 8, wherein the at least one elastically deformable part includes:
a first elastically deformable part, the first elastically deformable part including the at least one first bellows ridge and the at least one first bellows trough, the at least one first bellows ridge and the at least one first bellow trough extending along the first direction on the third insulation side part; and
a second elastically deformable part, the second elastically deformable part including at least one second bellows ridge and at least one second bellows trough, the at least one second bellows ridge and the at least one second bellows trough extending along the first direction on the fourth insulation side part.

12. The prismatic secondary battery as claimed in claim 8, wherein the at least one elastically deformable part includes:
a first elastically deformable part, the first elastically deformable part including the at least one first bellows ridge and the at least one first bellows trough, the at least one first bellows ridge and the at least one first bellows trough extending along the first direction on the first insulation side part; and
a second elastically deformable part, the second elastically deformable part including at least one second bellows ridge and at least one second bellows trough, the at least one second bellows ridge and the at least one second bellows trough extending in the first direction on the second insulation side part.

13. The prismatic secondary battery as claimed in claim 8, wherein the at least one elastically deformable part includes:
a first elastically deformable part, the first elastically deformable part including the at least one first bellows ridge and the at least one first bellows trough, the at least one first bellows ridge and the at least one first bellows trough extending along the first direction on the first insulation side part;
a second elastically deformable part, the second elastically deformable part including at least one second bellows ridge and at least one second bellows trough, the at least one second bellows ridge and the at least one second bellows trough extending along the first direction on the second insulation side part,
a third elastically deformable part, the third elastically deformable part including elastically deformable holes passing through the third insulation side part and being arrayed in the first direction; and
a fourth elastically deformable part, the fourth elastically deformable part including elastically deformable holes passing through the fourth insulation side part and being arrayed in the first direction.

14. The prismatic secondary battery as claimed in claim 1, wherein:
the insulation tube includes at least two elastically deformable parts at sides thereof,
one of the elastically deformable parts includes:
the at least one first bellows ridge; and
the at least one first bellows trough, and
another of the elastically deformable parts includes a plurality of elastically deformable holes passing through the insulation tube, the elastically deformable holes being arrayed in the first direction of the insulation tube.

* * * * *